UNITED STATES PATENT OFFICE.

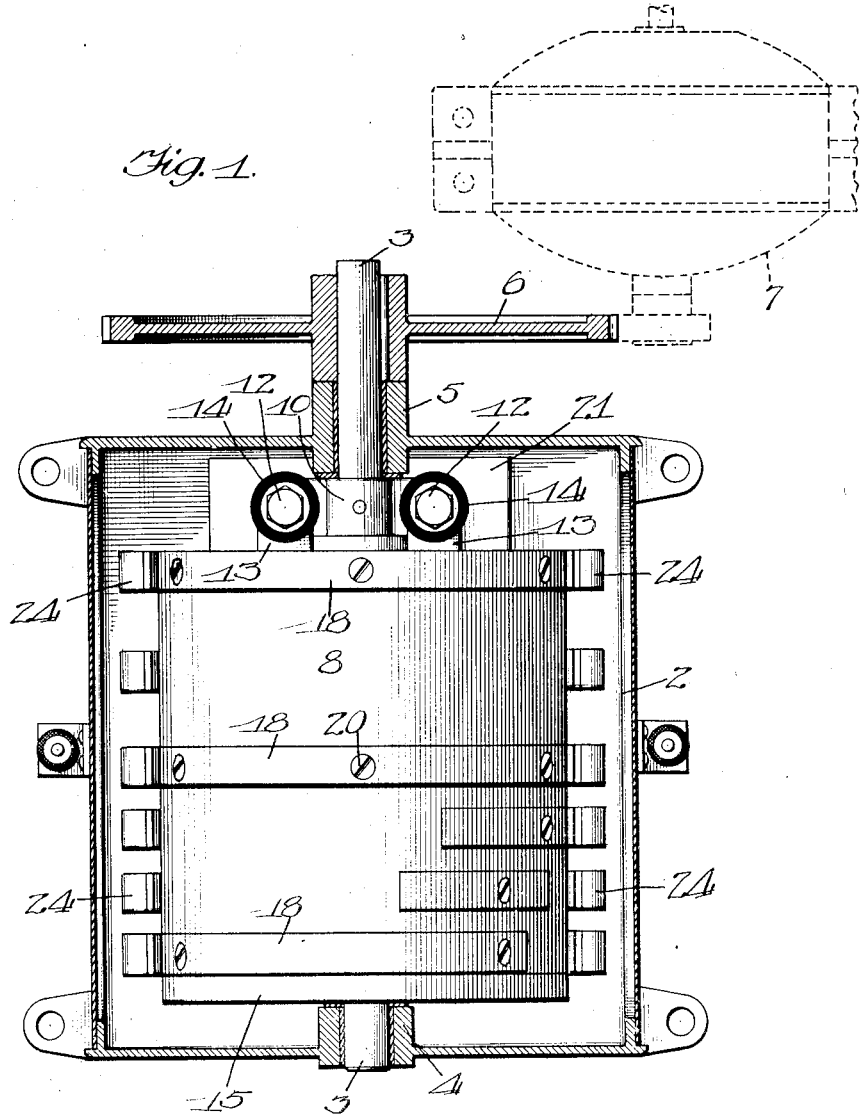

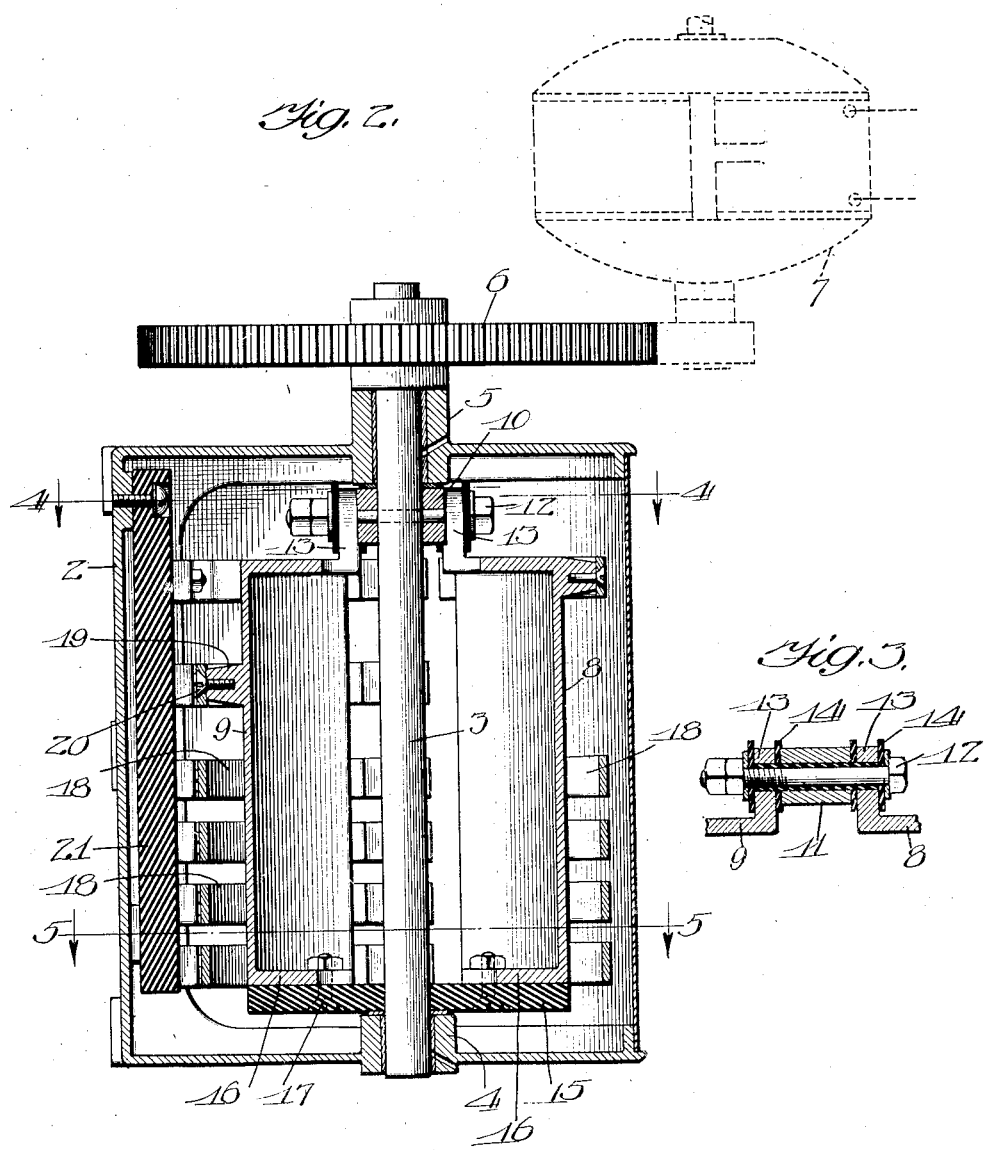

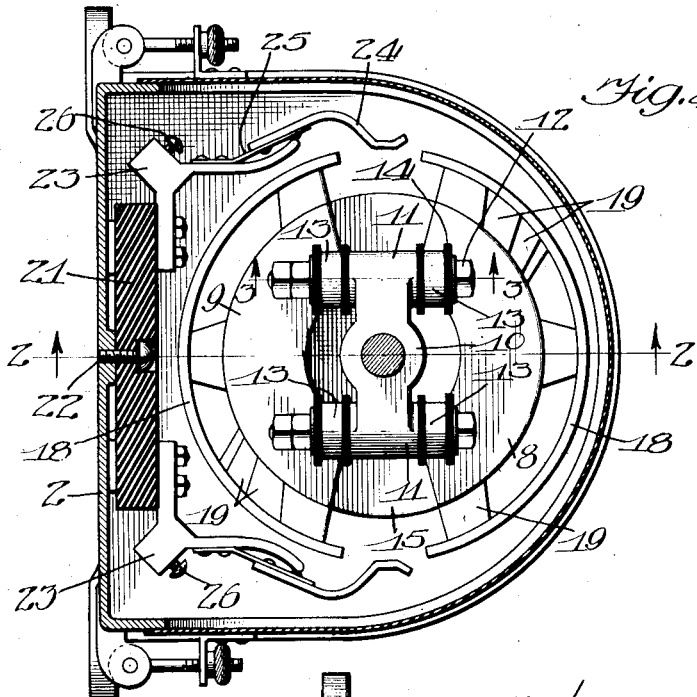
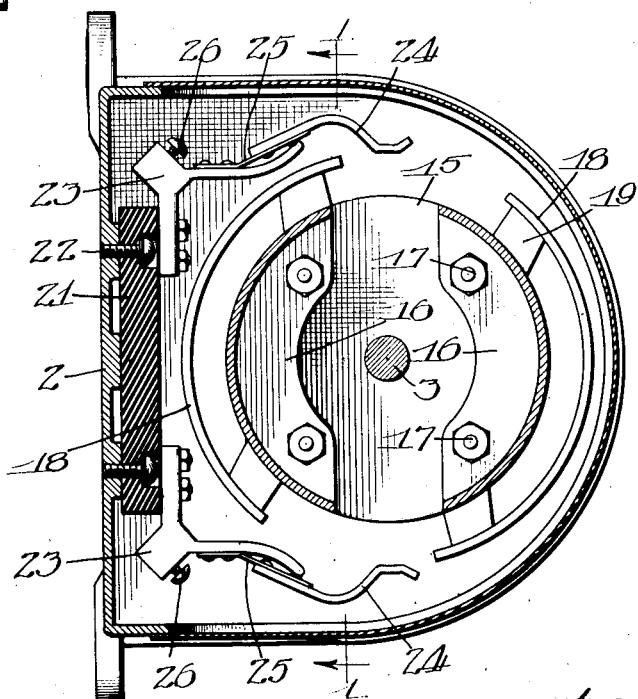

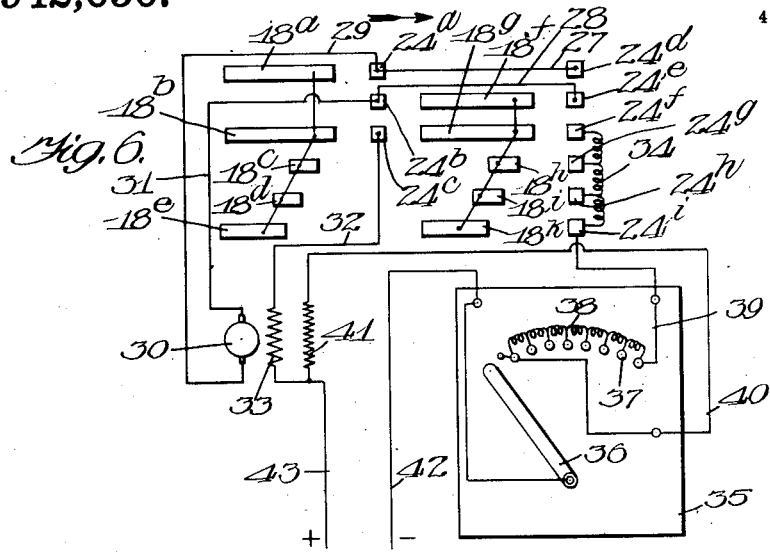

THOMAS E. BARNUM, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

MOTOR-CONTROLLING DEVICE.

942,050.  Specification of Letters Patent.  Patented Dec. 7, 1909.

Application filed March 14, 1907. Serial No. 362,352.

*To all whom it may concern:*

Be it known that I, THOMAS E. BARNUM, a citizen of the United States, residing at Milwaukee, in the county of Milwaukee and State of Wisconsin, have invented new and useful Improvements in Motor-Controlling Devices, of which the following is a full, clear, concise, and exact description, reference being had to the accompanying drawing, forming a part of this specification.

My invention relates to improvements in motor controlling devices.

One of the objects of my invention is to provide means for automatically reversing the motor at predetermined intervals.

In certain mechanisms operated by electric motors, it frequently happens that it is desirable to automatically and at predetermined intervals, reverse the action of the mechanism. This is particularly true with respect to washing machines and the like, as it is desirable to operate the washing machine in one direction for a certain predetermined time, and then to reverse the movement of the washing machine and have it operate in a reverse direction for a length of time.

My invention is especially designed for controlling electric motors for operating washing machines, and is so arranged that at regular intervals it reverses the direction of operation of the motor.

It will be understood that while my invention is particularly applicable to controlling motors for running washing machines, it is not limited to such use, and may be used in various other places where a controller of this character is desirable.

For the purpose of disclosing my invention, I have illustrated one embodiment thereof in the accompanying drawings.

In said drawings: Figure 1 is a front elevation of my controller with the casing in section. Fig. 2 is a sectional view thereof. Fig. 3 is a detail view of the means for securing the drum sections to the shaft. Fig. 4 is a sectional view taken on the line 4—4 of Fig. 2. Fig. 5 is a sectional view taken on the line 5—5 of Fig. 2. Fig. 6 is a diagrammatic view of the circuit arrangement for operating one motor. Fig. 7 is a diagrammatic view of the circuit arrangement for operating two motors.

In the embodiment of my invention illustrated, I provide an inclosing and supporting casing 2, preferably formed of two parts only, the back top and bottom being formed in one piece, and the sides and front being formed in one piece. A shaft 3 is arranged to extend vertically through said casing, being supported in suitable journals 4 and 5, formed in the top and bottom of the casing, and is provided at one end with a gear wheel 6, by which the controller is operated. This gear wheel may be connected to a source of power, as for instance a small motor 7 arranged in proximity to the controller, and having pinion arranged to mesh with the gear wheel.

A drum formed of two sections 8 and 9 is rigidly mounted upon the shaft, by a suitable clamping member, which comprises a collar 10, secured upon the shaft and having arms 11 extending therefrom, through which are arranged to pass bolts 12, which secure upwardly extending lugs 13 of the sections 8 and 9 to the arms 11. Suitable insulating disks 14 are interposed between the arms 11, the bolts 12 and the lugs 13 of the drum sections to properly insulate the drum from the shaft. The lower ends of the drum are secured to the shaft in a manner slightly different from that of the upper end. Upon the lower end of the shaft, an insulating disk 15 is mounted in proximity to the ends of the drum sections, and the drum sections have inturned flanges 16, by which the sections are secured to the disk by bolts or screws 17 extending through the disk and flanges.

The drum sections carry suitable contacts 18, which are preferably secured by screws 20 upon projecting lugs 19, formed on the drum. These contacts 18 are arranged upon the drum sections, in such a manner as to obtain the proper operation of the motor, as will more fully appear in the diagrammatic view.

Mounted within the casing and secured to the back thereof is a base of insulating material 21, secured in position by any suitable means as by screws 22. The base 21 carries supports 23 for contact fingers 24. These fingers are preferably secured to the supports 23 by a spring arm 25. The outer ends of the fingers 24 are arranged to engage the contacts 18 on the drum, whereby electrical circuit is established. The supports 23 are provided with binding posts 26, by which the various conductors may be secured in electrical connection with the fingers 24.

In Fig. 6 I have shown a diagrammatic view of the circuit arrangement, and a developed view of the contacts of the drum. It will be understood that in the structure shown in Figs. 1 to 5, the sections 8 and 9 of the drums act as a conductor between various contacts secured thereon. In the diagrammatic view, however, I have illustrated the various contacts as being connected by conductors. I will use exponents to distinguish the various contacts on the drum as well as to identify the various contact fingers. The contacts of one section of the drum comprise two long contacts $18^a$ and $18^b$, and the three shorter contacts $18^c$, $18^d$ and $18^e$. The contacts on the other section of the drum comprise two long contacts, $18^f$ and $18^g$, and the shorter contacts $18^h$, $18^i$ and $18^k$. In the structure provided for operating a single motor, three contact fingers $24^a$, $24^b$ and $24^c$ are provided upon one side of the base, and six contact fingers $24^d$ to $24^i$ are provided upon the opposite side of the base. The contact fingers $24^a$ and $24^d$ are connected by a conductor 27 and the contact fingers $24^b$ and $24^e$ are connected by a conductor 28. The contact finger $24^a$ is connected by conductor 29 with one terminal of the armature 30 of the motor. The contact finger $24^c$ is connected by conductor 32 with one terminal of the series field winding 33 of the motor. The contact fingers $24^f$ to $24^i$, are connected with sections of a resistance 34. A starting box 35 is provided for the motor, the movable element 36 of which is arranged to sweep over and engage a plurality of contacts 37 connected with a resistance 38. The last of the contacts 37 is connected by conductor 39 with the contact finger $24^i$. The first of the contacts 37 is connected by conductor 40 with one terminal of the shunt field winding 41 of the motor. The movable arm 36 of the starting box is connected with the negative side 42 of the supply main, and one terminal of the series field and of the shunt field is connected with the positive side 43 of the supply main.

In operation assuming that the drum moves in the direction of the arrow, then the contacts $18^a$ and $18^b$ will engage fingers $24^a$ and $24^c$ and at the same time the contacts $18^f$ and $18^g$ will engage contact fingers $24^e$ and $24^f$. With the contacts above mentioned in engagement with their coöperated fingers, the movable member 36 of the starting box is moved into engagement with the first of the contacts 37. Circuit will then be closed from the positive side 43 of the line, through the series field winding 33, by conductor 32 to finger $24^c$, thence by contact $18^b$ to contact $18^a$, finger $24^a$, conductor 29, armature 30, conductor 31, contact finger $24^e$, contact $18^f$, contact $18^g$, contact $24^f$, resistance 34, conductor 39, resistance 38, movable arm 36, and back to the negative side 42 of the line. At the same time a shunt field circuit is established from the positive line 43, through the shunt field winding 41, by conductor 40, arm 36, back to the negative main 42. The motor is thus started with all resistance in circuit. As the arm 36 is moved to the right it cuts out resistance 38 from the armature circuit and the motor builds up in speed. As the drum continues to rotate, the contacts $18^h$ to $18^k$ will respectively engage the contact fingers $24^g$ to $24^i$, and cut the resistance 34 out of the armature circuit, increasing the speed of the motor to the maximum. Further rotation of the drum causes the contacts $18^a$ and $18^b$ to pass off contact fingers $24^a$ and $24^c$ and engage contact fingers $24^d$, and $24^f$, and at the same time causes contacts $18^f$ and $18^g$ to engage fingers $24^b$ and $24^e$. This reverses the flow of current, through the armature of the motor, reversing the motor, and at the same time reinstates the resistance 34 in the armature circuit. When the motor is reversed, current flows from the positive side 43 of the line, through the series field winding 33, by conductor 32, contact finger $24^c$, thence to contact $18^g$, and by contact $18^g$ to contact finger $24^b$, thence by conductor 31, through the armature 30 of the motor, by conductor 29, to contact finger $24^a$, by conductor 27, contact finger $24^d$, thence to contact $18^a$, and from contact $18^b$ to contact finger $24^f$, through the resistance 34, the starting box 35, to the negative side 42 of the line. As the contacts $18^c$, $18^d$ and $18^e$ engage the fingers $24^g$, $24^h$ and $24^i$, the resistance 34 will be cut out of the armature circuit and the motor again builds up in speed. It will thus be seen that by my construction of controller, I am enabled to operate the controller continuously, to periodically reverse the direction of operation of the motor, and upon each reversal of the direction of operation of the motor, insert and gradually cut out a resistance in the armature circuit.

In Fig. 7 I have illustrated a diagrammatic view of the circuit arrangement for my controller when two motors are used. In addition to the contact fingers $24^a$ to $24^i$, I provide contact fingers $24^k$, $24^l$ and $24^m$. These fingers are connected with a resistance 44.

In operation, assuming that the controller is moved in the direction of the arrow and that the handle of the starting boxes 45 and 35 have been closed, then upon the engagement of the contacts $18^a$ and $18^b$, with contact fingers $24^a$ and $24^c$, and the engagement of the contacts $18^f$ and $18^g$, with contact fingers $24^e$ and $24^f$, circuit will be closed from the positive side 46 of the line, through conductor 47, to contact finger $24^a$, thence to contact 18ᵃ, contact 18ᵇ, contact finger 24ᶜ, through all of the resistance 44, by conductor 48, through the armature 49 of one of the motors, conductor 50, arm 51, of the starting box 35, conductor 52, contact finger 24ᶠ and contact 18ᵍ, thence to contact 18ᶠ, by contact finger 24ᵉ, conductor 52, contact finger 24ᵇ and by conductor 53, to the negative side 54 of the line. A branch circuit is also established from the contact finger 24ᶜ, by conductor 55, through the armature 56, of the other motor, conductor 57, arm 58 of the starting box 45, conductor 59, resistance 34, finger 24ᶠ, and from thence to the opposite side of the line as has been previously traced. The shunt field 60 of the armature 56 is connected with the positive side of the line 46, by conductor 61, and to the opposite side of the line by conductors 62 and 53. The shunt field 64 of the armature 49 is connected to the two sides of the line by conductors 65 and 66. As the contacts 18ᶜ to 18ᵉ engage the contact fingers 24ᵏ to 24ᵐ, the resistance 44 is cut out of the circuit of the armature 49, gradually increasing speed thereof, and as the contact fingers 18ʰ to 18ᵏ respectively engage contact fingers 24ᵍ to 24ⁱ, the resistance 34 is cut out, section by section from the armature 56 of the motor, increasing the speed thereof. The continued rotation of the drum causes the contacts 18ᵃ and 18ᵇ to pass off the contact fingers 24ᵃ and 24ᶜ and engage contact fingers 24ᵈ and 24ᶠ, and the contacts 18ᶠ and 18ᵍ, to engage contact fingers 24ᵇ and 24ᵉ which reverses the current through the armature of the motors, thereby reversing the direction of the operation of the same. The continued movement of the arm causes the contacts 18ʰ to 18ᵏ to engage fingers 24ᵏ to 24ᵐ, cutting out the resistance from the circuit of the armatures of the motors.

It will be noted that in the system for controlling two motors by means of a single controller, I provide a starting box or other suitable instrumentality for each motor so that each motor may be thrown into and out of operation independently of the other.

Having thus described my invention what I claim as new and desire to secure by Letters Patent is:

1. In a controller for electric motors, in combination, a supporting frame, a shaft revolubly mounted in said frame, two drum sections rigidly mounted on said shaft, said drum sections being insulated from said shaft and from each other, a set of contact segments carried by each of said drum sections, and stationary contact fingers arranged to be engaged by said contact segments, said shaft being adapted to be continuously rotated in one direction to cause said sets of contact segments to alternately engage said contact fingers to periodically change the circuit connections of the motor.

2. In a controller for electric motors, in combination, a supporting frame, a shaft revolubly mounted in said frame, two drum sections rigidly mounted on said shaft, said drum sections being insulated from said shaft and from each other, a set of contact segments carried by each of said drum sections, and two oppositely disposed sets of contact fingers mounted on said frame, said shaft being adapted to be continuously rotated in one direction to cause said sets of contact segments to alternately engage said sets of contact fingers, certain of the segments on each drum section being arranged to coöperate with said contact fingers to control the direction of operation of the motor; and the other of said segments being arranged to coöperate with said contact fingers to gradually remove a resistance from the motor circuit upon each reversal of the motor.

3. In a controller for electric motors, in combination, a supporting frame, a shaft revolubly mounted thereon, two drum sections rigidly mounted on said shaft, said drum sections being insulated from said shaft and from each other, contact segments carried by each of said drum sections and stationary contact fingers arranged to be engaged by said contact segments, certain of said segments on each drum section being arranged to coöperate with said contact fingers to control the direction of operation of the motor, and other of said segments on each drum section being arranged to coöperate with said contact fingers to gradually remove a resistance from the motor circuit upon each reversal of the motor, said resistance controlling segments being similarly arranged on both of said drum sections to insure gradual removal of the resistance from the motor circuit when said shaft is continuously rotated in one direction to periodically reverse the operation of the motor.

In witness whereof, I have hereunto subscribed my name in the presence of two witnesses.

THOMAS E. BARNUM.

Witnesses:
 OSCAR A. KELLER,
 A. H. BARNICKEL.